United States Patent

Masucci

[15] 3,698,801

[45] Oct. 17, 1972

[54] SPECTACLES WITH ADJUSTABLE LENSES

[72] Inventor: Alan A. Masucci, 1910 University Avenue, New York, N.Y. 10003

[22] Filed: March 31, 1971

[21] Appl. No.: 129,913

[52] U.S. Cl. ..................................351/55, 351/107
[51] Int. Cl. ..............................................G02b 7/06
[58] Field of Search...............................351/55, 107

[56] References Cited

UNITED STATES PATENTS 3,425,773    2/1969    Masucci .......................351/55

FOREIGN PATENTS OR APPLICATIONS 427,831    5/1935    Great Britain................351/55

*Primary Examiner*—David Schonberg
*Assistant Examiner*—John W. Leonard
*Attorney*—William V. Pesce

[57] ABSTRACT

Spectacles with adjustable lenses which include a frame with extended arms and bridge, the bridge having gear-track means for holding fast a lens chassis capable of assuming a plurality of positions relative to frame. The lens chassis includes a pair of lenses and a bridge structure supporting said lens, the bridge structure including a shaft having rotatable gears at its extremities for movement along said frame gear-track and in confinement therewith. The lens chassis permits different viewing area of the lens to be exposed when the chassis is moved along said gear-track.

2 Claims, 5 Drawing Figures

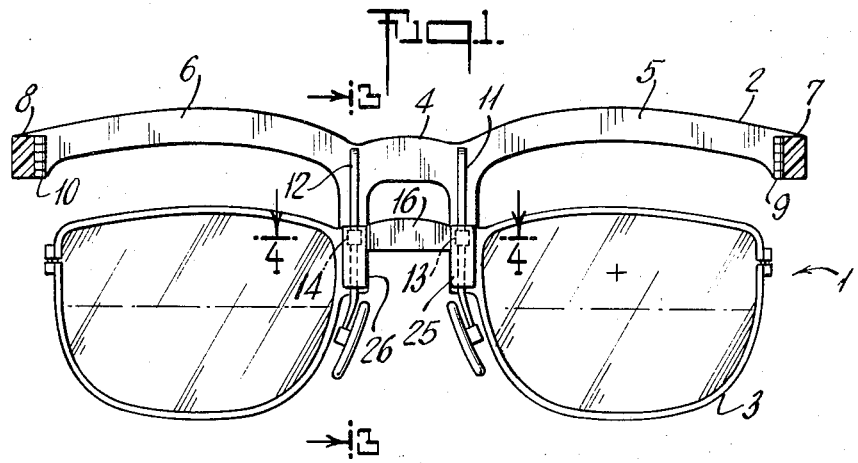
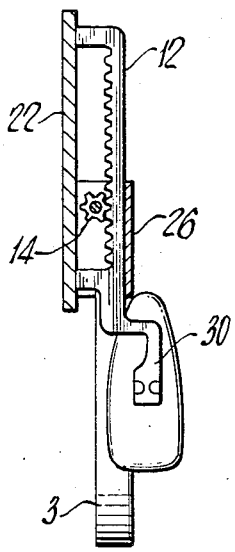
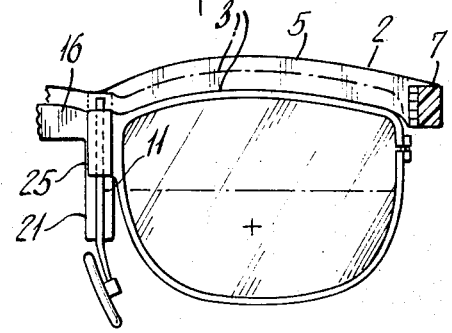
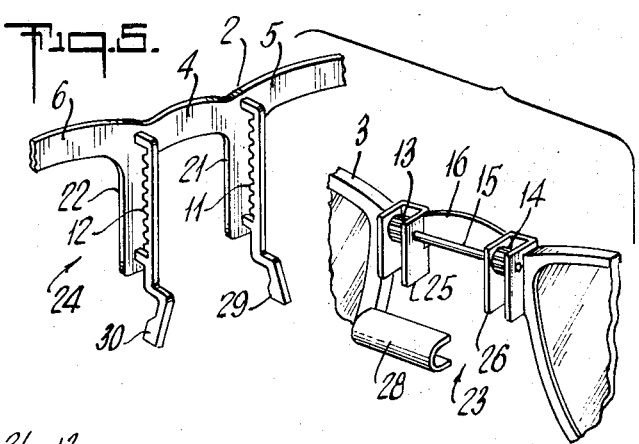
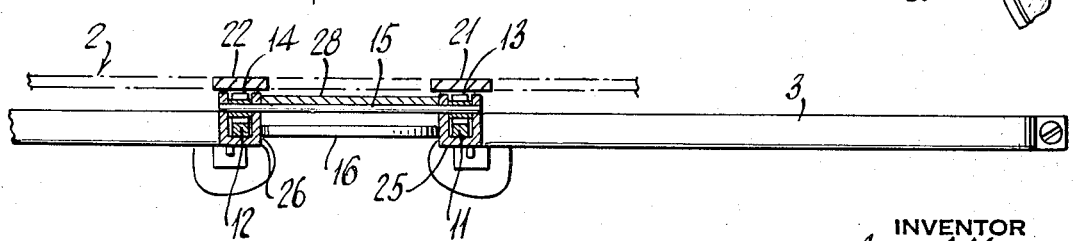
INVENTOR
ALAN A. MASUCCI
ATTORNEY

SPECTACLES WITH ADJUSTABLE LENSES

It is an object of the present invention to provide a simple, rugged, easily adjustable pair of spectacles wherein the field of view is alterable without changing the line of sight of viewer.

Another object of the invention is to provide an adjustable pair of spectacles whose lenses may be adjusted to one of two positions to provide two different viewing areas of the lens.

A still further object of the invention is to provide adjustable lenses which permit smooth relative motion of lens chassis relative to bridge and prevents bending, erratic motion and permits use of only one hand or element of adjustment.

Other objects and advantages will become apparent from a reading of the specification and a study of the accompanying drawings in which:

FIG. 1 shows an elevational view of the spectacles bearing frame and carriage according to the invention;

FIG. 2 shows an elevational view of a single section of frame and chassis with lens positioned to furtherest upward position;

FIG. 3 shows a sectional view through the line 3—3 of FIG. 1;

FIG. 4 shows a sectional view through the line 4—4 of FIG. 1;

FIG. 5 shows in perspective a section of frame and chassis and the gear-track for positioning the lens chassis relative to said frame.

Now, describing the invention with respect to the various FIGURES, and throughout the specifications like parts will be given the same reference numbers, there is shown particularly in FIG. 1 a pair of spectacles 1 having a frame 2 and lens chassis 3 disposed to move relative thereto according to the invention described herein.

In particular, FIG. 1 shows a frame 2 composed of a central bridge portion 4 attached to on opposing sides, a pair of extended arms 5 and 6 whose extremes 7 and 8 carry a pair of hinge joints 9 and 10 for pivotally mounting the forward ends of temples, not shown, in a well-known manner. The central bridge member 4 further includes a pair of spaced-apart ratchet type gear-tracks 11 and 12 for receiving tracking gears 13 and 14 fixedly attached to gear shaft 15 on opposing ends thereof and lens chassis 3 along the bridge portion 16 thereof. The said tracking gears 13 and 14 are disposed to ride along said ratchet gear-track to permit relative displacement of lens chassis and frame to permit different fields of view.

In FIG. 3, a view through the line 3—3 of FIG. 1 shows in particular the gear-track 12 and tracking gear 14 in operable engagement therewith. The gears, 13 and 14, are entrapped within the space 20 between frame depending arms 21 and 22 and gear-tracks 11 and 12, respectively. As previously indicated, the tracking gears 13 and 14 are each fixedly attached to a support rotatable shaft 15, said shaft and gears being made to rotate as a singular unit, the free movement of one transmits immediate motion to the other.

For mounting purposes, as shown in FIG. 5, the chassis portion 23 is attached to the frame 24 by removing shaft 15 and gears 13, 14 attached thereto and inserting chassis to frame via channel-like supports 25 and 26 attached to bridge portion 16 of chassis 23. The supports 25 and 26 are made to bridge or cover tracks 11 and 12 and held in place by the gear and shaft arrangement above described, and as shown by FIG. 4, when assembled. Cover piece 28 is made to slide over shaft 15 and is fixedly attached to supports 25 and 26 to facilitate the up-and-down movement of chassis relative to frame. The gear-tracks 11 and 12 each have depending therefrom at their lower extremities nose rests 29 and 30 for the usual purpose.

Referring to FIGS. 1 and 2, it may be seen that the chassis relative to frame are displaced in different positions to afford the user different fields of view. In particular, FIG. 1 represents an exaggerated maximum displacement of chassis and frame permitting the user to view through the upper portion of lens. Conversely, FIG. 2's partially up track permits the user to view through the lower portion of lens. However, it may be appreciated that various fields of view in between and at two extremes is possible by simply manipulating and adjusting the gearing movements between frame and chassis. Hence, simple, rapid smooth and positive means is provided for adjusting the viewing area of the lens to permit the viewer to use different field of view of the lens without changing or altering his line-of-sight which can be cumbersome and sometimes hazardess, and also permitting him the easy facility of adjustment by the use of one hand, finger, etc., without the need for additional facilities.

While the invention has been described and illustrated with respect to a certain particular preferred embodiment which gives satisfactory results, it will be understood by those skilled in the art, after understanding the principles of the invention, that various changes and modifications may be made without departing from the spirit and scope of the invention and it is intended therefore in the appended claims to cover all such changes and modifications.

Having defined the invention, what is claimed is:

1. Spectacles with adjustable lenses comprising:
   a. a frame including a centrally disposed bridge having spaced-apart linear elongated gear-track means attached thereto,
   b. a lens chassis including a centrally disposed bridge having a gear shaft including gear members fixedly attached thereto at opposing extremes of said shaft,
   c. means for mounting said frame to the chassis via said gear-track means and gear shaft with attached gears to allow the said gears to be operable with said tracks to facilitate the relative free movement of chassis and frame to permit different fields of view, said mounting means including chassis supports for slidably engaging said tracks to maintain traction between frame and chassis, said chassis supports substantially covering said gears and gear track means.

2. Spectacles with adjustable lenses according to claim 1 and wherein said gear-track means includes a pair of ratchet type gears associated with a single side of said tracks.

* * * * *